Alfred Wilhelm
Alfred Löhr
INVENTORS.

Alfred Wilhelm
Alfred Löhr
INVENTORS.

Alfred Wilhelm
Alfred Löhr
INVENTORS.

UnitedStatesPatentOffice 3,295,434
Patented Jan. 3, 1967

3,295,434
ROASTING DEVICE
Alfred Wilhelm, Essen-Bredeney, and Alfred Löhr, Bochum, Germany, assignors to Firma F. Kuppersbusch & Sohne Aktiengesellschaft, Gelsenkirchen, Germany, a corporation of Germany
Filed Dec. 30, 1964, Ser. No. 422,189
Claims priority, application Germany, Jan. 4, 1964, K 51,770; Oct. 9, 1964, K 54,209
12 Claims. (Cl. 99—346)

The present invention relates to automatic roasting and broiling devices of the general type wherein the meat or other foodstuffs to be roasted are displaced relatively to heating means thereby effecting a uniform distribution of the roasting heat over the foodstuffs.

In most conventional devices of this type the foodstuff must be basted by hand or otherwise treated with liquids (e.g. water, gravies, cooking fats or the like) to prevent dessication. Such an apparatus has thus required careful attention by the operator and substantially continuous attendance, while limiting the effective serial and large-scale roasting of food items.

It is the principal object of the present invention to provide a roasting apparatus capable of carrying out a substantially continuous roasting operation without necessitating the continuous attention of an operator.

A more specific object of the invention is to provide an apparatus of the class described which enables the roasting of foodstuffs in an economical and efficient manner while carrying out the process in such way as to yield roasted articles which are tasty, moist and pleasing to the eye.

Yet another object of the invention is to provide an automatic roasting device which is adjustable for the various goods to be cooked, able to permit rapid insertion or removal of the foodstuffs, and admits of visual inspection when required.

These objects and others which will become apparent hereinafter are attained, in accordance with the present invention, by a generally elongated roasting device having continuous conveyor elements for transport of the articles to be broiled or roasted along a closed transport path. The elongated housing includes in addition to the aforementioned transport means a plurality of carrying members adapted to span the conveyor elements and displaceable thereby along the closed transport path for subjecting the foodstuffs to the heat of one or more radiant-energy sources spaced along the transport path. The transport means, i.e. the pair of conveyor elements entraining the retaining members, can be provided with means bringing it into the proximity of a charging opening or passage through which the foodstuffs can be added to the retaining members or removed therefrom when fully roasted. An important characteristic of the apparatus, according to this invention, is the provision of spray means along the transport path and preferably thereabove where the transport path has a substantially horizontal reach, for distributing a water of another basting liquid of the character previously described onto the foodstuffs carried by the retaining elements past the spraying station. Thus, the radiant-heating means distributed around the transport path can be interrupted at the station at which the foodstuffs are treated with the spray.

According to a more specific feature of this invention, the carrying members are basket-like shells depending from the conveyor elements and deflected, in the region of a charging opening, toward the latter to permit of removal of the retaining member or replacement of the foodstuffs contained therein. It is preferred that the heating means be constituted by infrared radiators or the like although means for insuring the convection flow of warm air through the housing have been found to be advantageous. The localized heating produced by most infrared sources can thus be tempered by a convective heating. When line or point sources of heat are employed, it has been found to be advantageous to provide baffle means of a heat-reflective material between these sources and the transport path, the baffle means serving as sheet-like reradiators of thermal energy and as partitions defining with the walls of the housing ducts for sustaining the convective flow of heat. This arrangement insures that the foodstuffs will be subjected to a uniform heat and a substantially constant temperature generally intermediate the temperatures of the hot spots and cold spots normally produced when point or line sources are employed. The homogeneity of the heating can be further improved by providing heat-storage means in the region of the heat sources which level off the heating peaks to which the roasted articles may otherwise be subjected. The heat-storage means further serves, at the conclusion of the roasting process, to maintain the temperature within the interior of the roasting oven and keep the foodstuffs at serving temperature as long as desired. The heat-storage means can be any of the conventional refractory ceramic materials and can be provided in a solid or in a comminuted state between suitable retaining walls.

In a preferred construction of the oven the housing is vertically elongated and provided with heating means along opposite vertical walls of the housing generally parallel to the major passes of the conveyor means, the spray means being provided between these walls and above the transport path. Below the transport path, advantageously in line with the spraying station, a collector can be provided for recovery of the cooking juices, gravy, fats or the like released by the foodstuff during the roasting process or dripping therefrom as the spray means subjects the roasting material to treatment with water (which may then mix with the cooking juices), previously recovered juices and liquids, or freshly prepared basting substances.

The conveyor means includes a pair of conveyors disposed along opposite lateral sides of the housing in respective vertical planes and preferably outwardly of the heating means which can then be provided upon the remaining vertical walls. The conveyor means, i.e. chains or the like capable of withstanding the elevated temperatures within the housing, can pass over respective roller means (e.g. sprocket wheels) at the upper and lower ends of the housing, deflecting means being provided at an intermediate location along the transport path for bringing the conveyor means and the carrying members entrained thereby toward the charging opening. When the housing is horizontally elongated, the roller means at one of its ends can be juxtaposed with the charging opening so as to enable insertion or removal of foodstuffs, with or without their carrying members; in this case, separate deflecting means need not be provided. In the vertical arrangement, advantage is gained by the fact that the liquid-spray means is disposed at an upper end of the casing so that the liquid trickles downwardly from the foodstuff temporarily at an upper level to the roast of a lower carrying member prior to collection in a suitable trough or pan. It is thus evident that a roasting of an oven according to the present invention permits relatively slow and continuous cooking of a foodstuff to be broiled or roasted while ensuring that it is heated uniformly on substantially all of its sides. The foodstuff thus roasts or stews in its own juices with the necessary slowness required for tasty cooking and a pleasing appearance.

The carrying means may be baskets as mentioned earlier, pans which are capable of collecting the cooking juices for so-called pan roasting and pan broiling, or spits thrust through the meat or other foodstuff to be cooked. For this purpose, the carrying members can be interchangeably and replaceably mounted upon the conveyor means; the retaining means then releasably interconnects the carrying means and the conveyor means while being so disposed and arranged that the carrying members can be removed easily from the housing through the charging door for extraction of the foodstuff or cleaning of the oven. In all cases, however, it is desirable that the foodstuff upon the carrying members be so held that during each complete pass of the conveyor means, the roast makes a full revolution relative to any point within the path, thereby exposing all surfaces of the roast to the heating means. For this purpose, the carrying members according to the present invention are pivotally mounted upon the conveyor pans and are freely swingable thereon so that their spatial orientation with respect to their respective pivotal axes remains the same as the foodstuff and carrying member is conveyed along the respective transport path. The structure described above permits the large-scale roasting and broiling of relatively large pieces of meat or the like with relatively long cooking times. The products are found to have the taste, appearance and characteristics of roasts hitherto produceable in casseroles, roasting and stewing pans or the like under ordinary conditions. A product close to that obtainable in the home can thus be produced in large kitchens and at relative high rates without interfering with the high-speed preparation of foods.

The above and other objects, features and advantages of the present invention will become more readily apparent from the following description, reference being made to the accompanying drawing in which.

Figure 1:
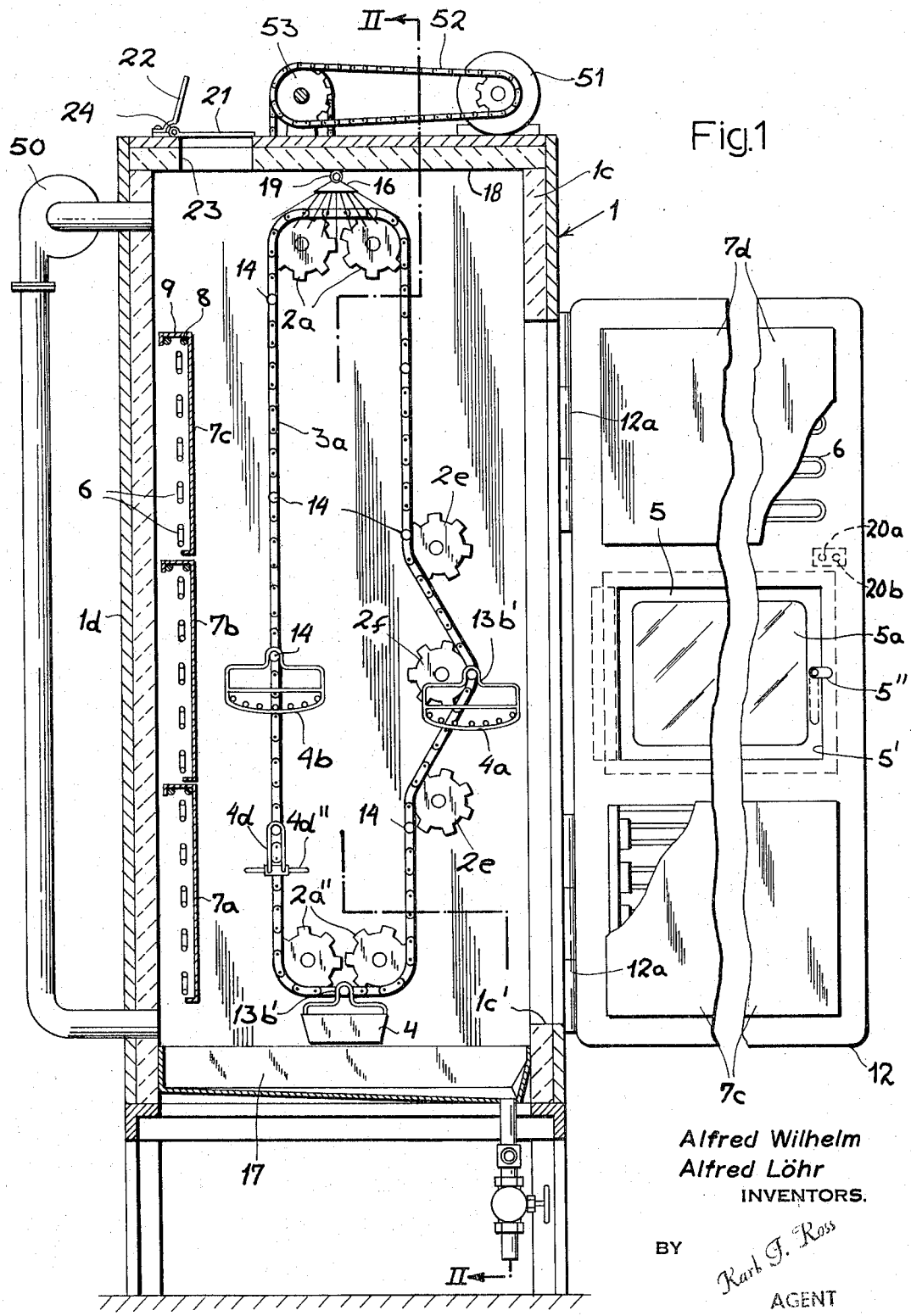
FIG. 1 is a vertical cross-sectional view of an automatic roasting oven in accordance with the present invention.
Figure 2:
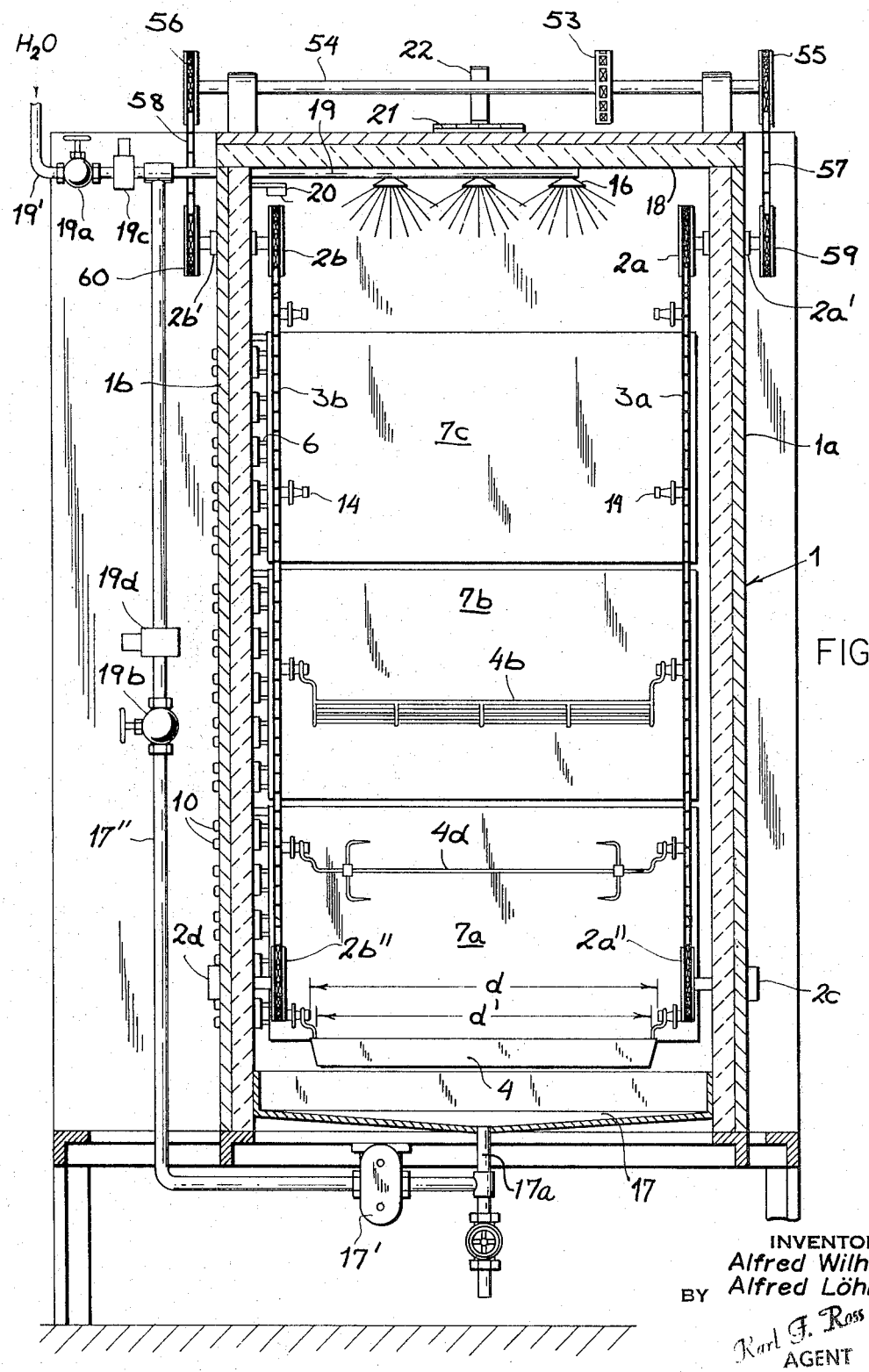
FIG. 2 is a cross-sectional view taken along the line II—II of FIG. 1.
Figure 3:
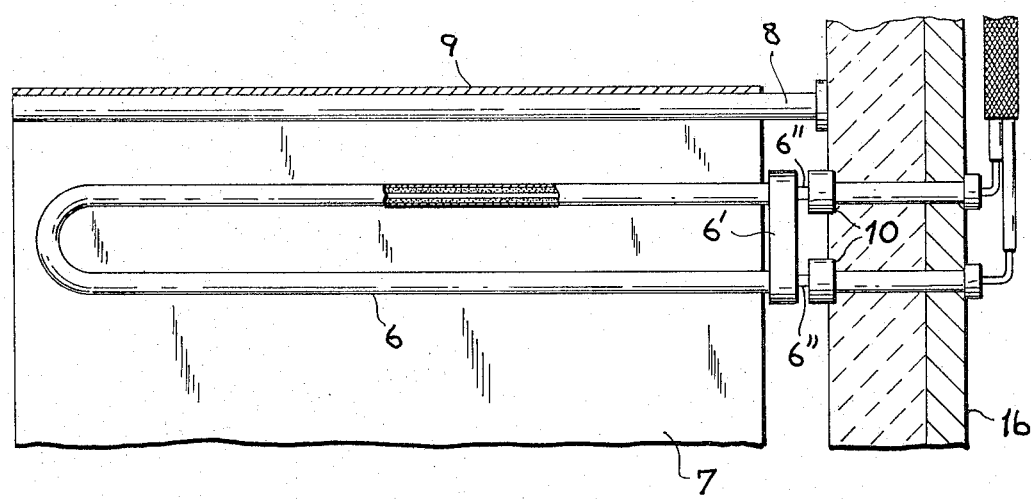
FIG. 3 is a fragmentary detail view, drawn to an enlarged scale, illustrating a portion of the heating means of FIG. 1.

In FIGS. 1–3, there is shown an automatic roasting and broiling oven which comprises an upright housing 1; the latter can be composed of sheet metal lined interiorly with ceramic material or other heat-storing means. The housing 1 is provided at its upper end with roller means upon which the conveyor chains 3 are guided. Thus, the housing 1 can be considered to have a pair of lateral walls 1a, 1b, each of which carries at its upper end a pair of rollers 2a or 2b in the form of respective sprocket wheels journaled in bearings 2a', 2b' through which the shafts of the sprocket wheels 2a and 2b extend. At the lower end of each wall 1a, 1b are provided similar sprocket wheels 2a'', 2b'' received in the respective bearings 2c and 2d. The sprocket wheels 2a and 2a'' upon wall 1a and the sprocket wheels 2b, 2b'' of wall 1b are disposed at the corners of respective rectangles so that the conveyor chains 3a, 3b along each of these walls extend along the opposite edges of the respective rectangle as illustrated in FIG. 1. The respective conveyor means 3a, 3b thus lie in vertical planes generally parallel to the walls 1a and 1b while carrying jointly the respective members 4, 4a, 4b, etc., which, in turn, retain the foodstuffs to be roasted. The carrying members 4, 4a, 4b, etc. are spaced apart along the chains 3a, 3b, and are removably and interchangeably mounted thereon, as will be described hereinafter. The opposite vertical walls 1c and 1d of the housing 1 are formed with heating means described in detail with reference to FIGS. 1 and 3, although also seen in FIG. 2. Thus, the rear wall 1d of the housing carries the reflective plates 7a, 7b and 7c, while the front wall 1c is formed with a large and vertically elongated rectangular opening 1c' adapted to be closed by a door 12 mounted upon hinges 12a along one of its vertical edges. The reflective plates 7c and 7d are provided on this door 12 on opposite sides of a further opening 5' closed by a charging door 5 whose catch is shown at 5''. The charging door 5 which is sufficiently wide to permit insertion and removal of the carrying members 4, 4a, 4b, etc., may have a heat-resistant glass pane 5a to permit visual inspection of the interior of the oven and the goods to be roasted therein.

In the region of the charging opening 5', the conveyor 3a and 3b are deflected beyond the door 5 by a pair of idler sprockets 2e and the further sprocket wheel 2f which bring the carrying members 4, 4a, 4b, etc. close to the door as they sweep therepast.

As illustrated in FIGS. 1–3, the heating means along the walls 1c and 1d include respective planar arrays of U-shaped heating elements 6 of a resistance-heating type. Such elements generally comprise a base 6' from which a U-shaped metal tube (e.g. of copper, stainless steel) projects, the tube carrying a resistance-heating wire or coil and a refractory mass (e.g. of sand or other silica-containing material). A pair of plug-like protuberances 6'' extend in the opposite direction from the base 6', which is of a heat-resistant electrically insulating ceramic, the protuberances 6'' being connected to the opposite ends of the resistant-heating element. According to the present invention, one of the walls 1a, 1b, namely the wall 1b as shown in FIG. 2, is provided with socket-like receptacles 10 adapted to receive the protuberances 6'' of the heating elements. Sockets 10 are, of course, coplanar, as are the U-shaped elements 6 themselves. It has been found that best results are obtained when the heating elements 6 are laterally spaced from the respective walls 1c, 1d and are underlain by ceramic heat-storage layers which can compose the walls themselves. Additionally, the thermally conductive heat-reflecting plates 7a through 7d overlie the heating elements 6 and are spaced from the walls 1c, 1d upon horizontal bars 8 which the hook-shaped flanges 9 of the plates 7a through 7d engage to allow the plates to be easily removed for cleaning. The hot air within the gap between the walls and the plates 7a through 7d moves in a convection current as does the air between the heating elements along the opposite walls. Cool air thus descends in the region of the median vertical plane between the walls 1c and 1d while rising along the reflective surfaces 7a through 7d in a continuous convection current which greatly reduces the formation of hot spots and ensures uniform roasting of the meat. The reflective plates 7a through 7d can be aluminum sheets with surfaces treated or modified to improve the radiation of heat therefrom toward the closed path along which the foodstuff is conveyed. The heat-storage capacity of the oven walls underlying the heating element 6 ensure that sufficient heat will be retained in the housing subsequent to de-energization of the heating element to maintain the temperature of the foodstuff at the serving temperature or thereabove for a prolonged period.

The aforedescribed arrangement of the heating means, reflecting plates and plug-type elements affords improved ability to clean the unit. For example, it is merely necessary to lift the plates 7a through 7d off their respective rods 8 to permit them to be removed from the oven for cleaning. The large size of door 12 permits the plates to be removed without difficulty. The heating element 6 can, moreover, also be withdrawn for cleaning, if necessary, although the disposition of the heating elements on either side of the transport path and outwardly of the spray cascading from the upper carrying members prevents accumulation of the cooking juices upon the heating surfaces and thus avoids carbonization thereof.

Figure 4:
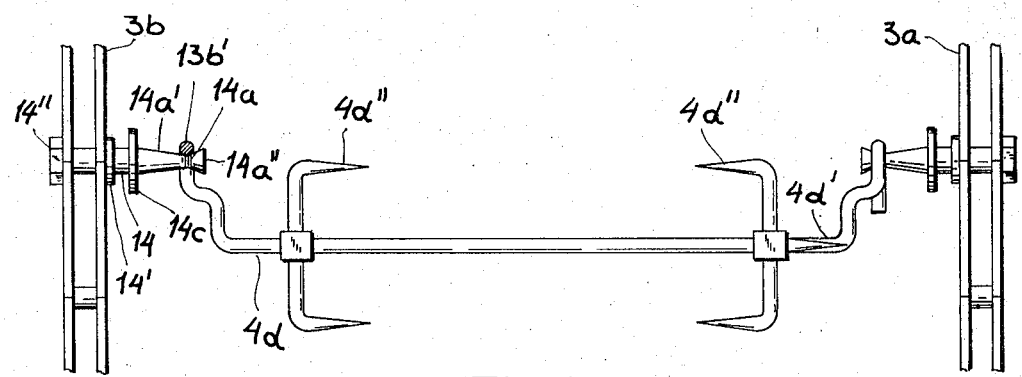
FIG. 4 is a view similar to FIG. 3, showing in an enlarged scale the retaining means whereby the carrying member can be affixed to the chain and is interchangeable with other carrying members thereof.

Referring now to FIGS. 1–4, it will be seen that the carrying members are easily removable from the chains 3a, 3b regardless of the type of carrying members employed. Thus, for example, the carrying member can be a spit 4d, as shown in FIG. 4; a pan, as illustrated at 4 in FIG. 2; or baskets, as shown at 4a and 4b in this latter figure. In each case, the carrying member can be provided with support yokes 13b, 13b' at its opposite extremities, these yokes (seen in elevation in FIG. 1) being slipped over the aligned carrying studs 14 disposed at spaced apart locations along the chains. As best seen in FIG. 4 the studs 14 project laterally of the chain and have heads 14' held thereagainst via a locking unt 14", clip or the like. An abutment shoulder or flange 14c is provided axially outwardly of the innermost end of each stud for engagement with a switch for controlling the spray (as will be apparent hereinafter) and to prevent axial movement of the carrying members during mounting of the latter upon the chains or during removal of the foodstuffs from the carrying member. The distance d between the innermost extremities of the studs 14 is slightly greater than the distance d' between the innermost portions of the outwardly bent yokes but slightly less than the distance between the outermost portions of these yokes so that the carrying members can be slipped onto the studs 14 transversely. To remove the carrying members, it is simply necessary to lift their yokes from the studs and pass them through the door of the housing. While the carrying member 4 of FIG. 2 is merely a pan in which the juices of the roasting meat collect, this carrying member being employed when less crisp foodstuffs are required, the baskets 4a and 4b are apertured to and constitute strainers permit passage of the juices from one carrying member to the other and thence to a collecting trough or pan 17. As shown in FIG. 4, however, it is also possible to provide spits 4d and 4d' which are interconnected by holders 4d" adapted to impale the roast and prevent it from moving upon the spits. It has been found that it is highly advantageous when the studs 14 are provided with annular grooves 14a at the junction between frustoconical surfaces 14a' and 14a", these surfaces serving to center the carrying members automatically.

At the upper part of the housing, we provide spray nozzles 16 which, as is illustrated in FIG. 1, confine their spray to the region of the transport path of the foodstuffs and are so shaped as to prevent deposit of spray upon the heating elements. The spray nozzle 16 can treat the foodstuffs with water, cooking juices or the like and, for this purpose, are supplied with an inlet tube 19 distributing the liquid to the spray nozzles 16. As previously mentioned, the liquid trickles down the vertical array of carrying members, especially when all of them are constructed with open work (e.g. as baskets). The excess liquid, cooking juices and gravy is accumulated at the trough 17 and may be removed for other uses or discarded via an outlet 17a. Alternately, these cooking liquids can be reconveyed to the pipe 19 by a pump 17' and a duct 17" for basting the roasts. Water can be added via a duct 19'. The valves 19a, 19b permit manual adjustment of the rate of flow and relative amounts of the liquid supplied to the pipe 19 which is affixed to the roof 18 of the housing. Solenoid-operated valves 19c, 19d are of the normally closed type and only permit flow of the liquid to the nozzle 16 when the switches 20a, 20b (disposed on the exterior of the housing in proximity of the charging door 5) or a parallel-connected switch 20 actuated by the abutment 14c of a respective stud 14 when each basket or other carrying member is brought into alignment with the nozzles 16. The addition of water from the exterior causes an instantaneous increase in the pressure within the housing and for this reason, a vent 23 is provided. The vent 23 is overlain by a self-closing flap 21 and is weighted so that it tends to return about its pivot 24 to its position shown in FIG. 1 wherein it covers the vent 23 but permits unidirectional pressure relief of the interior. An abutment 22 in the form of an angled bar, is provided to prevent swinging of the flap 21 through an angle of 90° or greater so that a sudden increase in pressure cannot open the flap and swing it sufficiently to prevent its closing. In order to augment the convection currents within the housing, it has been found to be advantageous, under certain circumstances, to provide a blower 50 adapted to draw hot air from the top of the roasting oven and reintroduce it at the bottom thereof. The chains 3a and 3b are driven by a motor 51 via a transmission chain 52 which rotates the sprocket wheel 53 and thus a shaft 54 whose further sprocket wheels 55 and 56 are coupled by chains 57 and 58, respectively to driven sprockets 59, 60 rigidly connected with the wheels 2a and 2b over which the conveyor chains 3a and 3b pass. It is evident that the chains are thus driven synchronously.

Figure 5:
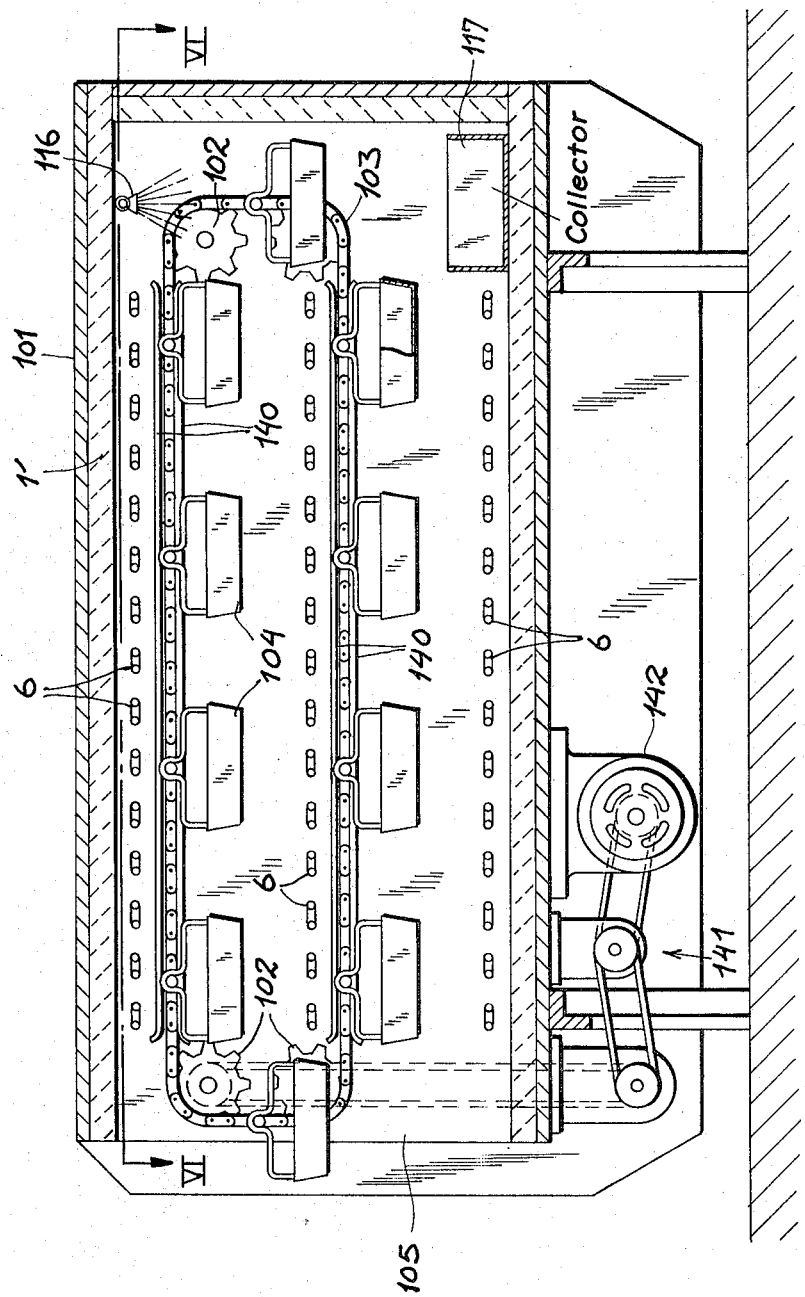
FIG. 5 is a vertical cross-sectional view through a horizontally elongated embodiment of the invention.
Figure 6:
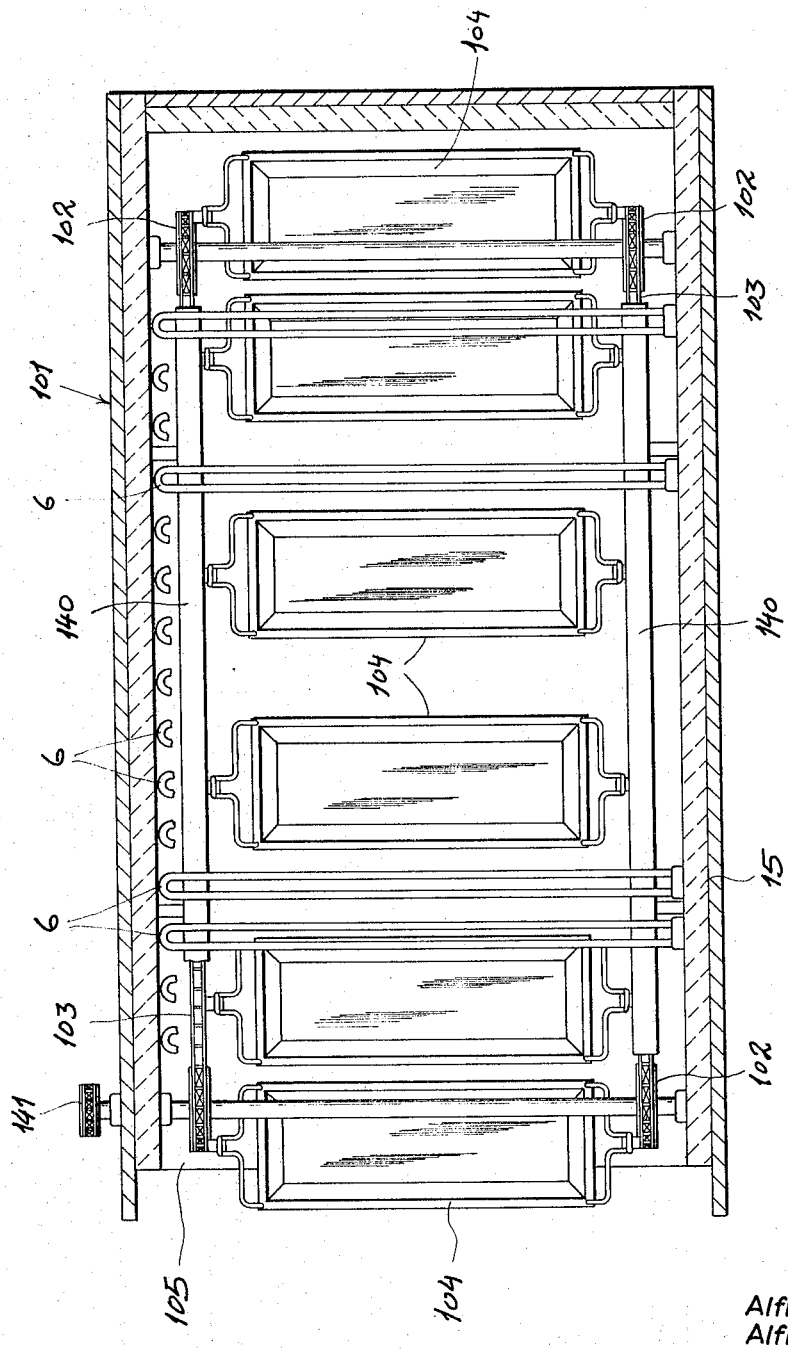
FIG. 6 is a cross-sectional view taken along the line VI—VI of FIG. 5.

In FIGS. 5 and 6 we show a modified roasting oven 101 wherein horizontal chains 103 pass over sprocket wheels 102 and carry pan-like members 104 which are freely swingable on and depend from studs in the manner previously described. In this case, the heating elements 6 are disposed in horizontal arrays while the plates 7 are dispensed with; a heat-storage layer 15 of a ceramic material is disposed behind the heating elements 6 to reradiate heat and thereby equalize the heating while retaining heat subsequent to the de-energization of the elements 6. Guides 140 are provided to prevent catenary deflection of the chains intermediate the sprocket wheels 102 which are driven via a transmission generally designated 141 by a motor 142. The spray nozzles 116 can be provided between the heating elements 6 although it is advantageous to provide these nozzles only at a side of the device offset from the heating elements as illustrated in FIG. 5. Excess liquid can be collected at 117 while automatic or manual means can be provided to turn on and off the sprays in the manner previously described. A discharging opening 105 permits insertion and removal of the foodstuffs.

The invention described and illustrated is believed to admit of many modifications within the ability of persons skilled in the art, all such modifications being considered within the spirit and scope of the following claims.

We claim:

1. An automatic roasting oven comprising a generally elongated housing; a pair of spaced apart endless conveyor elements displaceable in said housing; a plurality of carrying members entrainable by said conveyor elements and removably spanning them for transporting foodstuffs to be roasted over a substantially closed transport pattern; drive means for said conveyor elements; means in said housing above said path for spraying liquids onto the foodstuffs carried by said members; heating means positioned along said path for roasting said foodstuffs as they are transported therealong, said members being formed as strainers supporting said foodstuffs while permitting the passage of liquid therethrough; and roller means in said housing defining generally rectangular paths for each of said conveyor elements, said housing having walls extending parallel to the reaches of said conveyor elements, said heating means having generally planar configurations and being disposed along at least some of said walls parallel to said carrying members and including a layer of heat-retaining ceramic capable of maintaining the interior of said housing at an elevated temperature for prolonged periods, at least one substantially planar array of generally elongated electrical heating elements, and a heat-reflective plate disposed between said array and the foodstuffs carried by said members.

2. A roasting oven as defined in claim 1 wherein said housing is formed with a charging opening for inserting of foodstuffs into said housing and disposing them on said conveyor elements and then removing said foodstuffs from said housing, said conveyor elements being provided with deflecting means bringing said members into proximity with said opening for removal of said carrying members.

3. A roasting oven as defined in claim 1, wherein said generally planar array is parallel to at least one of said walls, said plate being parallel to said one of said walls while being spaced therefrom to sustain a convection-current flow of air within the interior of said housing and between said plate and said one of said walls, said plate being composed of aluminum and having an outer surface treated for reflecting heat toward said foodstuffs, a plurality of such plates and arrays being provided upon said one of said walls and an opposite further wall, all of said plates being removably mounted upon the respective wall, said heating elements being provided with plug-and-socket connections permitting them to be removably mounted on said housing.

4. An automatic roasting oven comprising a generally elongated housing; a pair of spaced apart endless conveyor elements displaceable in said housing; a plurality of carrying members entrainable by said conveyor elements and removably spanning them for transporting foodstuffs to be roasted over a substantially closed transport path; drive means for said conveyor elements; means in said housing above said path for spraying liquids onto the foodstuffs carried by said members; and heating means positioned along said path for roasting said foodstuffs as they are transported therealong, said members being formed as strainers supporting said foodstuffs while permitting the passage of liquid therethrough, said housing being vertically elongated and said transport path extending between the upper and lower ends of said housing, said means for spraying liquids being disposed at said upper end of said housing and including a plurality of nozzles dispensing a liquid spray onto the foodstuffs passing thereunder on said carrying members whereby excess liquid trickles downwardly therefrom from one of said members to another.

5. A roasting oven as defined in claim 4, further comprising blower means on said housing for circulating hot air therethrough.

6. A roasting oven as defined in claim 4, further comprising a supply pipe communicating with said nozzle and electromagnetic valve means along said supply pipe for selectively permitting and blocking the passage of liquid to said nozzles, and circuit means controlled by said conveyor elements for energizing said electromagnetic valve means upon juxtaposition of one of said carrying member with said nozzles.

7. A roasting oven as defined in claim 6 wherein said circuit means further includes generally operable switch means for energizing said electromagnetic valve means independently of the movement of said conveyor elements.

8. A roasting oven as defined in claim 4, further comprising retaining means on said conveyor elements for detachably receiving said carrying members, said conveyor elements being disposed in respective spaced apart parallel planes, said retaining means including aligned studs on said conveyor elements projecting inwardly thereof, said carrying members being provided with outwardly bent yokes engageable with said aligned studs upon lowering of said members onto said retaining means.

9. A roasting oven as defined in claim 8, wherein said studs frustoconically converge toward respective grooves formed thereon for receiving said yokes.

10. A roasting oven as defined in claim 4, further comprising collecting means in said housing below said path and aligned with said means for spraying liquids onto the foodstuffs for receiving excess liquids.

11. A roasting oven as defined in claim 4, wherein said conveyor elements and carrying members are removable together from said housing for cleaning.

12. An automatic roasting oven comprising a generally elongated housing; a pair of spaced apart endless conveyor elements displaceable in said housing; a plurality of carrying members entrainable by said conveyor elements and removably spanning them for transporting foodstuffs to be roasted over a substantially closed transport path; drive means for said conveyor elements; means in said housing above said path for spraying liquids onto the foodstuffs carried by said members; heating means positioned along said path for roasting said foodstuffs as they are transported therealong, said members being formed as strainers supporting said foodstuffs while permitting the passage of liquid therethrough, said housing being provided with a vent for equalizing the pressure within the interior of said housing with the pressure exteriorly of said housing; a flap overlying said vent and moveable to permit such pressure equalization; and abutment means preventing excessive displacement of said flap.

References Cited by the Examiner

UNITED STATES PATENTS

| | | | |
|---|---|---|---|
| 1,618,587 | 2/1927 | Grady | 99—427 |
| 1,638,452 | 8/1927 | Panajiotaros et al. | 99—386 XR |
| 1,732,010 | 10/1929 | Goodell | 99—346 X |
| 1,776,501 | 9/1930 | Grady | 99—334 |
| 2,047,565 | 7/1936 | Kip | 99—447 X |
| 2,134,474 | 10/1938 | Gillespie. | |
| 2,201,594 | 5/1940 | Sitts | 16—82 X |
| 2,221,595 | 11/1940 | Lockwood. | |
| 2,533,080 | 12/1950 | Alexander | 99—386 X |
| 2,626,773 | 1/1953 | Backman | 248—239 |
| 2,705,913 | 4/1955 | Bloom | 99—427 |
| 2,862,095 | 11/1958 | Scofield | 126—21 |
| 2,956,497 | 10/1960 | Bernstein | 99—421 |
| 3,002,731 | 10/1961 | Gelfand et al. | 134—48 X |
| 3,032,005 | 5/1962 | Garrison | 118—324 XR |

FOREIGN PATENTS 94,648   10/1962   Denmark.

BILLY J. WILHITE, *Primary Examiner.*

WALTER A. SCHEEL, *Examiner.*